United States Patent
Liao

(10) Patent No.: US 6,604,951 B2
(45) Date of Patent: Aug. 12, 2003

(54) ADAPTING HEAD HAVING A CHARGING MECHANISM

(76) Inventor: Sheng-Hsin Liao, No. 10, Alley 38, Lane 229, San Chun St., Shulin, Taipei Hsien (TW)

(*) Notice: Subject to any disclaimer, the term of this patent is extended or adjusted under 35 U.S.C. 154(b) by 0 days.

(21) Appl. No.: 09/945,639

(22) Filed: Sep. 5, 2001

(65) Prior Publication Data

US 2003/0036312 A1 Feb. 20, 2003

(30) Foreign Application Priority Data

Aug. 17, 2001 (TW) ........................... 90214125 U

(51) Int. Cl.⁷ .................... H01R 12/00; H05K 1/00
(52) U.S. Cl. ........................................ 439/76.1; 320/2
(58) Field of Search ................... 439/76.1, 67, 248, 439/620, 715, 686, 378, 697, 712–716, 456, 658, 76, 535, 545, 459, 467; 320/2, 15, 21, 49, 59, 61, 53, 57

(56) References Cited

U.S. PATENT DOCUMENTS 5,162,719 A * 11/1992 Tomura et al. ............... 320/2
5,663,630 A *  9/1997 Koziatek ..................... 320/49

* cited by examiner

Primary Examiner—Jean F. Duverne
(74) Attorney, Agent, or Firm—Rosenberg, Klein & Lee

(57) ABSTRACT

An adapting head having a charging mechanism comprises a main body, a circuit unit, first insertion elements, second insertion elements, and a bearing seat. A receiving space is disposed in the main body to receive the circuit unit. The circuit unit has a circuit board and a plurality of contact sheets. The first and second insertion elements are connected to two ends of the circuit board. The bearing seat is joined on the outside of the main body. The bearing seat can be integrally joined on the main body, or can be separately on the main body. One end of each of the contact sheets sticks into the bearing seat. The adapting head can be attached on an adaptor to simultaneously charge a plurality of electronic devices or rechargeable batteries, hence achieving more flexible and convenient use.

10 Claims, 14 Drawing Sheets

ADAPTING HEAD HAVING A CHARGING MECHANISM

FIELD OF THE INVENTION

The present invention relates to an adapting head having a charging mechanism and, more particularly, to an adapting head, which can be attached on an adaptor to simultaneously charge a plurality of electronic devices or rechargeable batteries, thereby achieving more convenient use.

BACKGROUND OF THE INVENTION

Along with continual progress of information technology, portable electronic devices such as notebook computers, mobile phones, and personal digital assistants (PDAs) have become commonly used articles in everyday lives. Through the action of a transforming circuit, an AC power of 110V or 220V is transformed into a DC power, which is then transferred to a general portable electronic device via an adaptor. The required electricity is thus provided to the portable electronic device.

Additionally, an adaptor can also be used to charge rechargeable batteries (e.g., Li-ion batteries, Ni-MH batteries, or Ni-Cd batteries) used in portable electronic devices.

However, a conventional adaptor can only charge a single electronic device or a single rechargeable battery, and cannot simultaneously charge a plurality of electronic devices or rechargeable batteries, hence resulting in limited usage and much inconvenience.

Accordingly, the above adaptor has inconvenience and drawbacks in practical use. The present invention aims to resolve the problems in the prior art.

SUMMARY OF THE INVENTION

The primary object of the present invention is to provide an adapting head having a charging mechanism. The adapting head of the present invention can be attached on an adaptor to simultaneously charge a plurality of electronic devices and rechargeable batteries, thereby achieving more convenient use.

To achieve the above object, the present invention provides an adapting head having a charging mechanism. The adapting head of the present invention comprises a main body, a circuit unit, a plurality of first insertion elements, a plurality of second insertion elements, and a bearing seat. A receiving space is disposed in the main body. The circuit unit is disposed in the receiving space. The circuit unit has a plurality of contact sheets. The first and second insertion elements are connected to the circuit unit. The bearing seat is joined on the main body. One end of each of the contact sheets sticks into the bearing seat. An adapting head having a charging mechanism is thus formed.

The various objects and advantages of the present invention will be more readily understood from the following detailed description when read in conjunction with the appended drawing, in which:

DETAILED DESCRIPTION OF THE PREFERRED EMBODIMENTS

Figure 1:
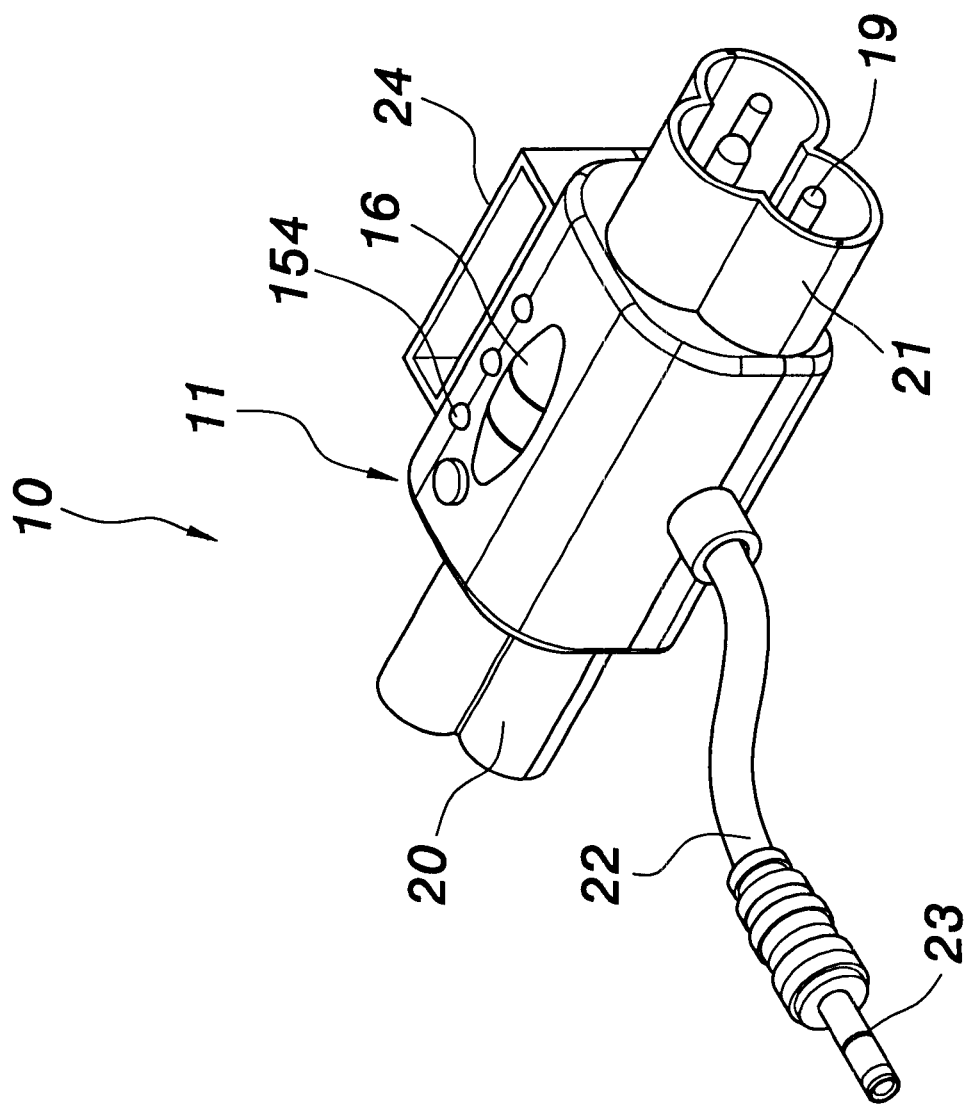
FIG. 1 is a perspective view of a first embodiment of the present invention.
Figure 2:
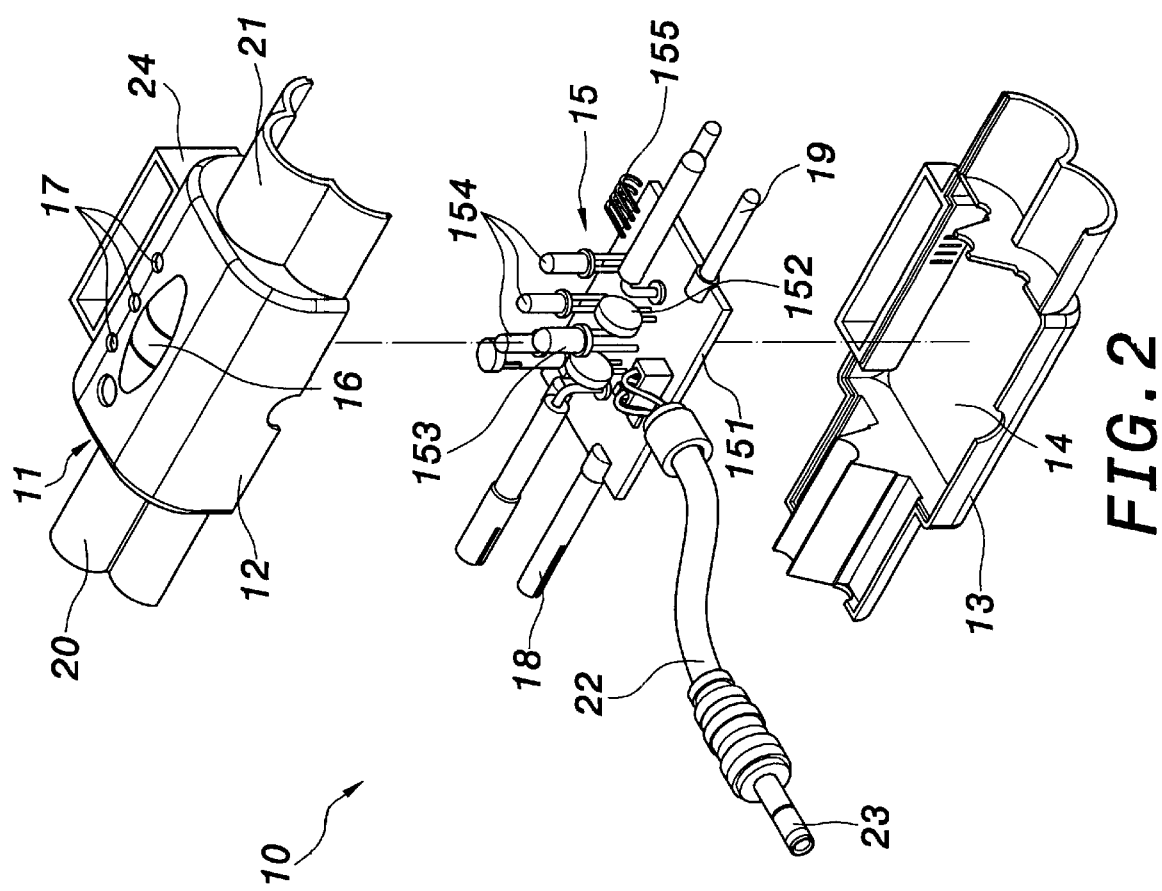
FIG. 2 is an exploded perspective view of the first embodiment of the present invention.
Figure 3:
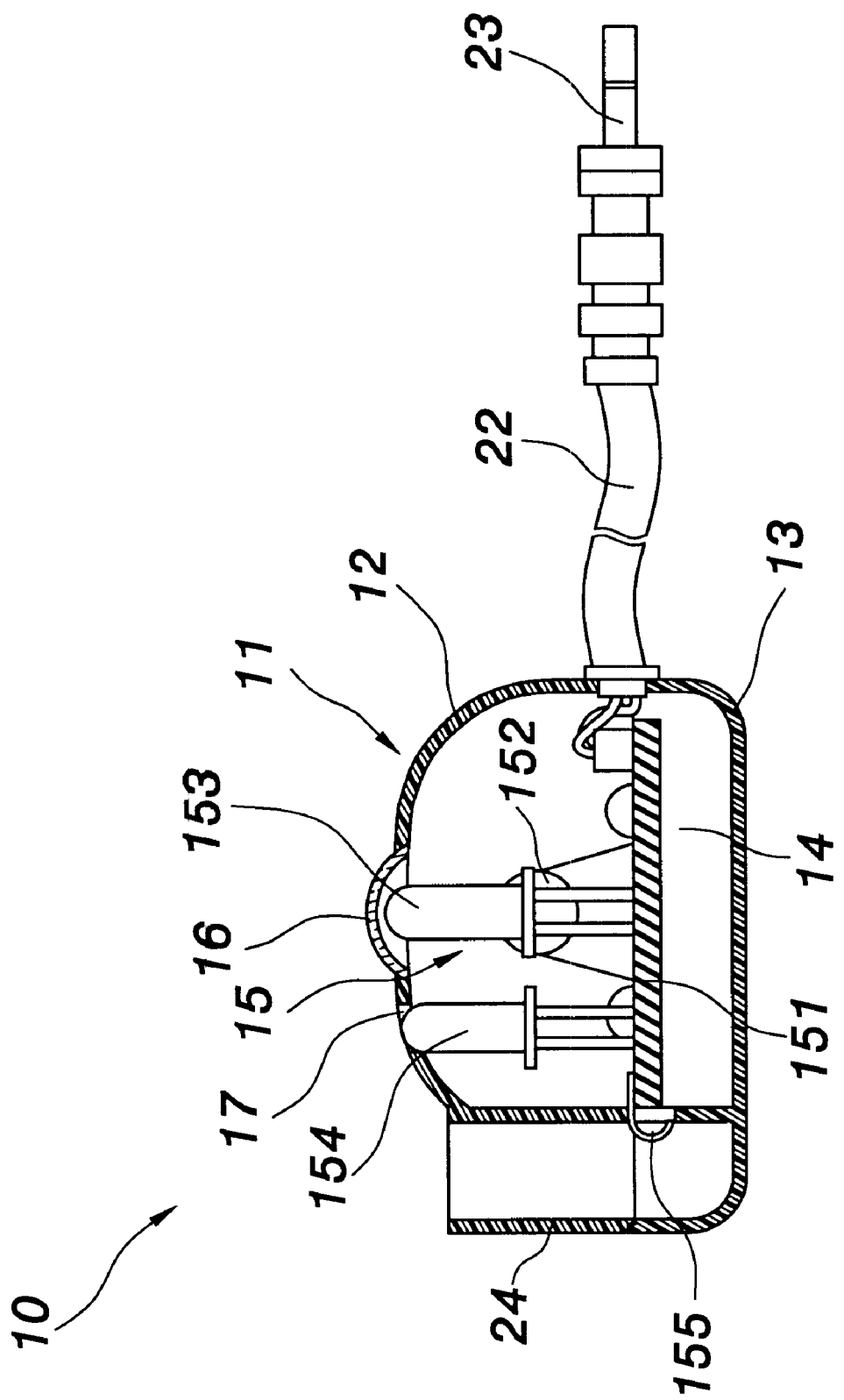
FIG. 3 is a cross-sectional view of the first embodiment of the present invention.

As shown in FIGS. 1, 2, and 3 show a preferred embodiment of an adapting head having a charging mechanism of the present invention. The adapting head 10 comprises a main body 11, a circuit unit 15, a plurality of first insertion elements 18, a plurality of second insertion elements 19, and a bearing seat 24. The main body 11 is a hollow shell body, which is formed of a first half body 12 and a second half body 13 by means of retaining, screwing with screws, or supersonic splicing. A receiving space 14 is disposed in the main body 11 to receive the circuit unit 15.

The circuit unit 15 comprises a circuit board 151 and a plurality of electronic devices 152. The circuit unit 15 is disposed in the receiving space 14. A plurality of indication lamps 153 and 154 are also disposed on the circuit board 151. The indication lamps 153 and 154 are light sources such as light-emitting diodes or light bulbs, and can be used to display the use state. A light-penetrating cover 16 and through holes 17 corresponding to the indication lamps 153 and 154 are disposed on the main body 11 so that light of the indication lamps 153 and 154 can project out. A plurality of resilient contact sheets 155 are also disposed on the circuit board 151. The contact sheets 155 achieve electric connection with the circuit board 151.

The first insertion elements 18 are connected to one end of the circuit board 151, and the second insertion elements 19 are connected to the other end of the circuit board 151. The first and second insertion elements 18 and 19 are made of conducting material to achieve electric connection with the circuit board 151. A first insertion portion 20 and a second insertion portion 21 corresponding to the first and second insertion elements 18 and 19 are disposed at two ends of the main body 11. The first and second insertion portions 20 and 21 are hollow shell bodies sheathing the first and second insertion elements 18 and 19. The first and second insertion portions 20 and 21 can be used to plug with adaptors or other corresponding sockets and plugs. The circuit board 151 also uses a cable 22 to connect a plug 23 so that the plug 23 can achieve electric connection with the circuit board 151. The plug 23 can be used to plug with a portable electronic device such as a mobile phone.

The bearing seat 24 is joined on the outside of the main body 11. The bearing seat 24 can be integrally joined on the main body 11, or can be separately joined on the main body 11. In this embodiment, the bearing seat 24 is integrally joined on the main body 11. The bearing seat 24 and the main body 11 are integrally formed by mold ejection. The bearing seat 24 is a hollow shell body. The shape of the bearing seat 24 is not limited, and can vary according to necessity. The top of the bearing seat 24 is open so that a rechargeable battery can be inserted in the bearing seat 24. One end of each of the contact sheets 155 sticks into the bottom inside the bearing seat 24.

Figure 4:
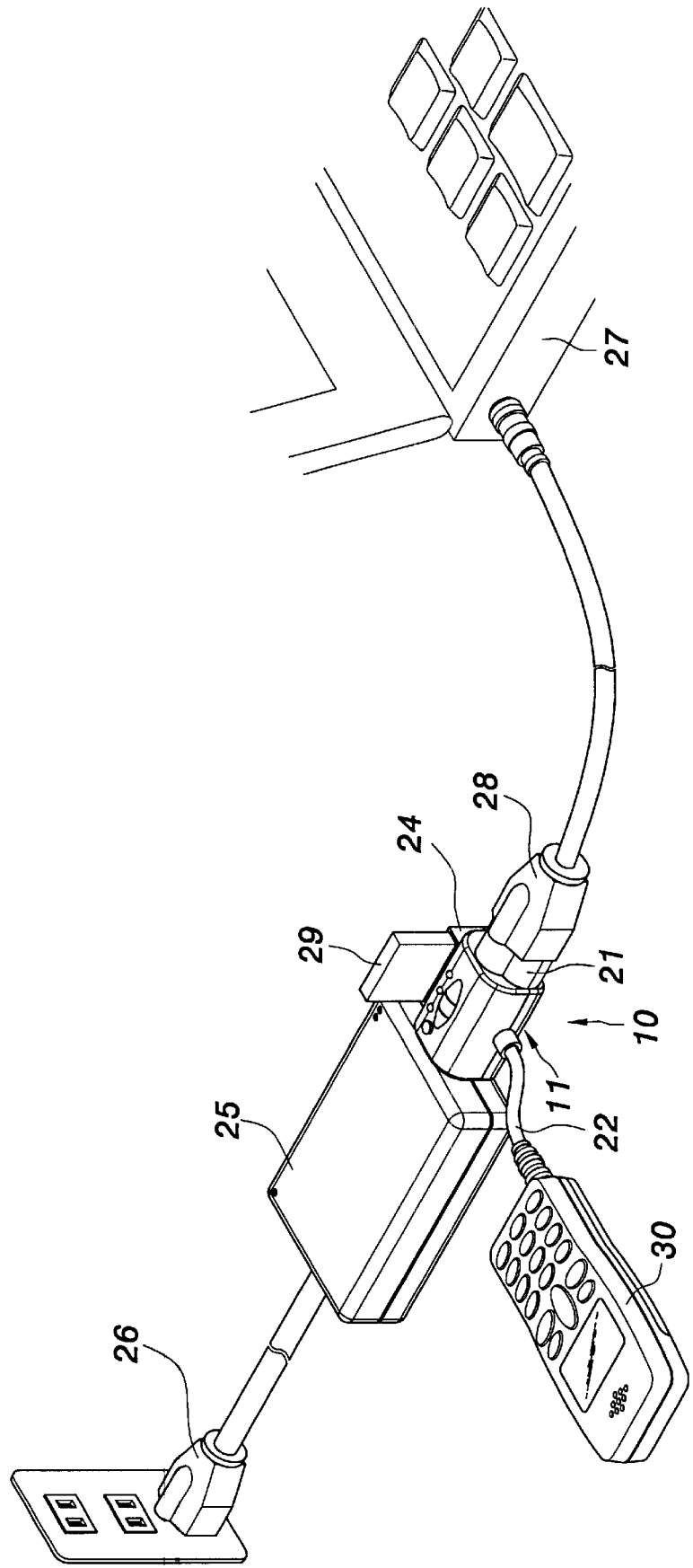
FIG. 4 is a diagram showing a use state of the first embodiment of the present invention.

As shown in FIG. 4, a plug 26 of a general adaptor 25 can be plugged into an AC socket of 110V or 220V. Through the action of a transforming circuit, a DC power is obtained. The first insertion portion 20 of the adapting head 10 of the present invention can be inserted into the output end of the adaptor 25 so that the first insertion elements 18 can achieve electric connection with the adaptor 25. A plug 28 connected to a portable electronic device 27 is then inserted into the second insertion portion 21 of the adapting head 10 so that the plug 28 of the electronic device 27 can achieve electric connection with the second insertion elements 19. The adaptor 25 can thus acquire a DC power. In other words, a DC power can be transferred to the electronic device 27 via the adapting head 10 of the present invention, hence providing the required electricity for the electronic device 27 or charging a rechargeable battery used in electronic devices.

Additionally, a rechargeable battery 29 to be charged can be simultaneously inserted into the bearing seat 24 to let contact terminals at the bottom of the battery 29 achieve electric connection with the contact sheets 155 so that the contact sheets 155 can charge the battery 29 inserted in the bearing seat 24. Desktop-charging function is thus provided. Another portable electronic device 30 to be charged can also be simultaneously plugged with the plug 23 connected to the cable 22 so as to charge a battery in the electronic device 30. Travel-charging function is thus provided.

Therefore, after the adapting head 10 of the present invention is attached on the adaptor 25, a plurality of electronic devices or rechargeable batteries can be simultaneously charged, hence achieving more flexible use. A user can thus simultaneously charge electronic devices (e.g., notebook computers, mobile phones, and PDAs) and rechargeable batteries.

Figure 5:
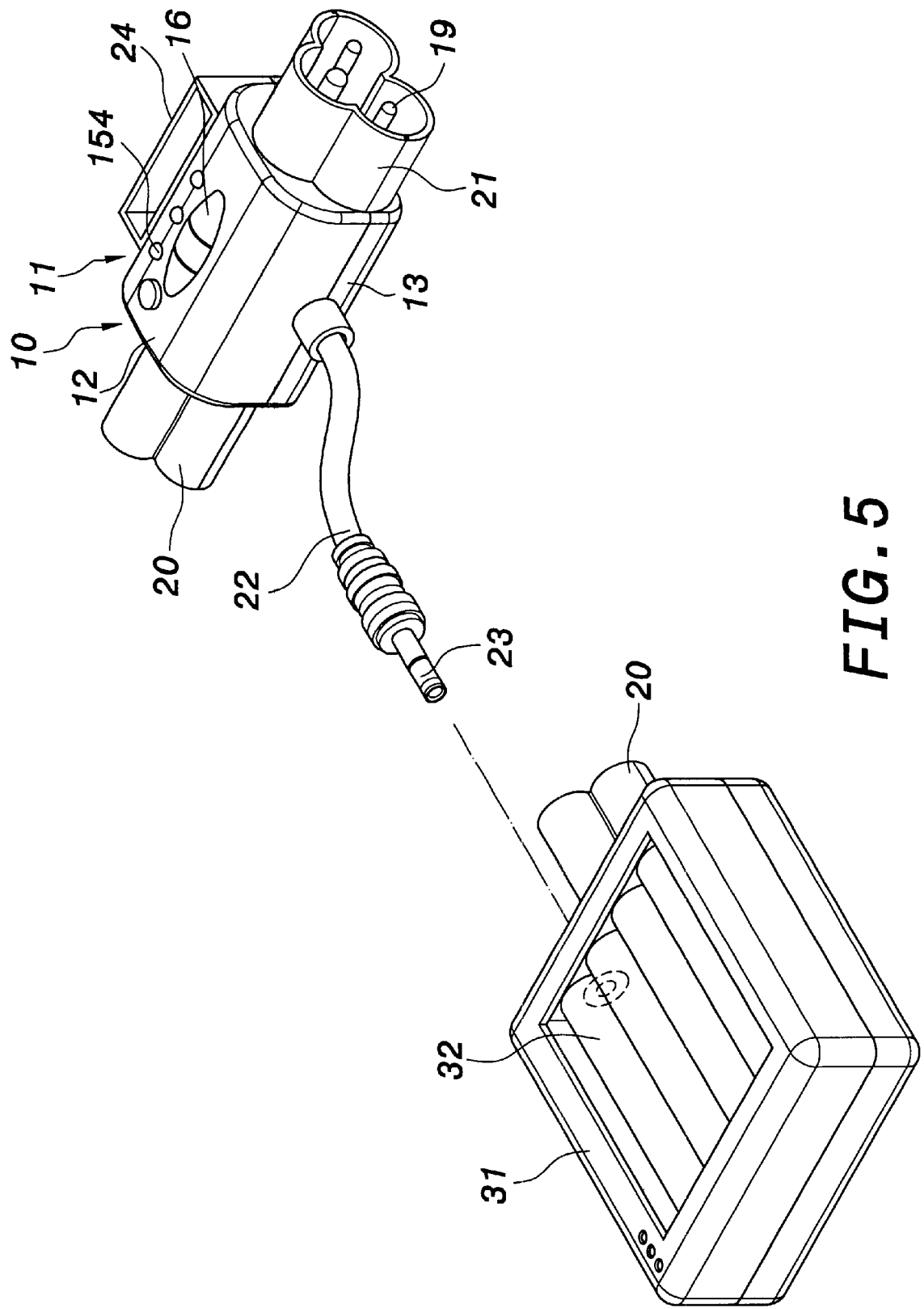
FIG. 5 is a diagram showing another use state of the first embodiment of the present invention.

As shown in FIG. 5, the adapting head 10 of the present invention can also be connected to the plug 23 of the cable 22, and the plug 23 can then plugged into a charger 31 of another type, hence charging a rechargeable battery 32 in the charger 31.

Figure 6:
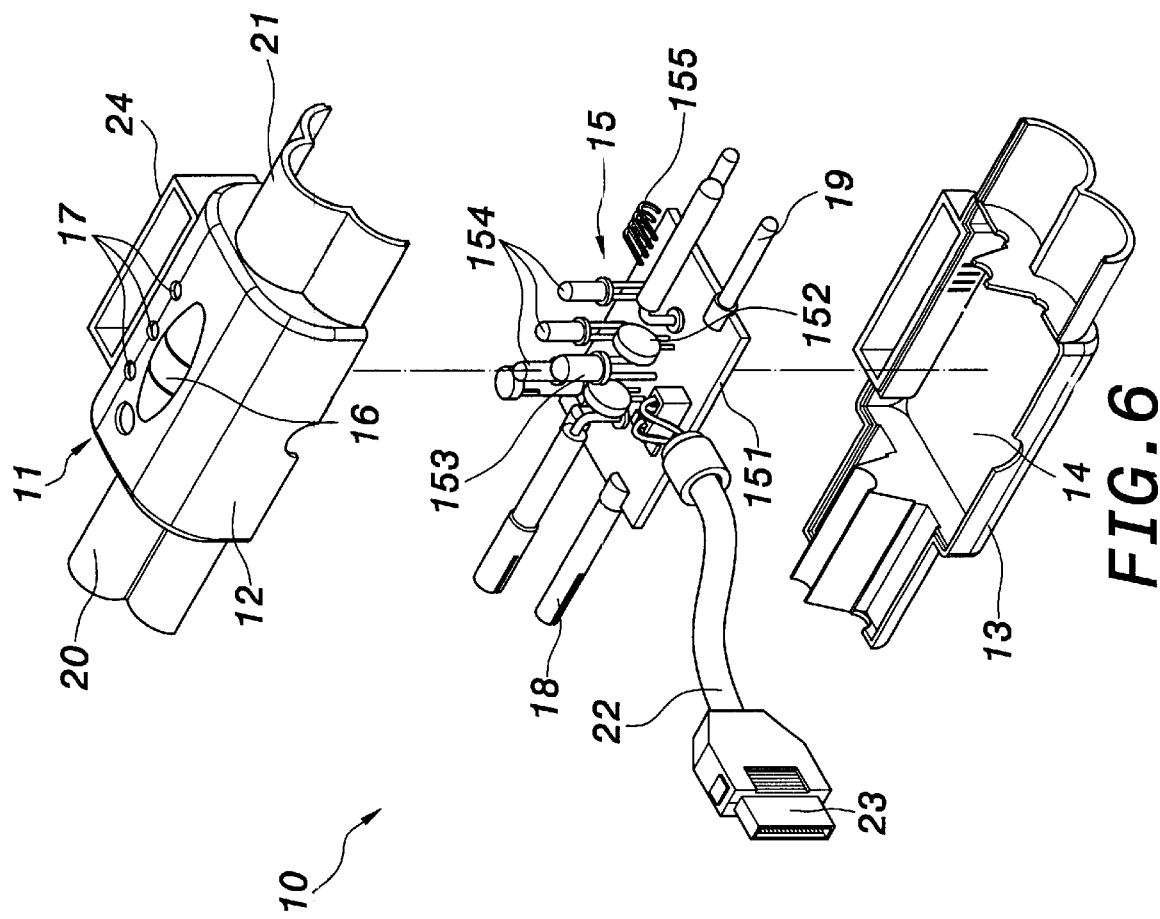
FIG. 6 is an exploded perspective view of a second embodiment of the present invention.

As shown in FIG. 6, the plug 23 of the cable 22 of the present invention can also be a plug or a connector of another type.

Figure 7:
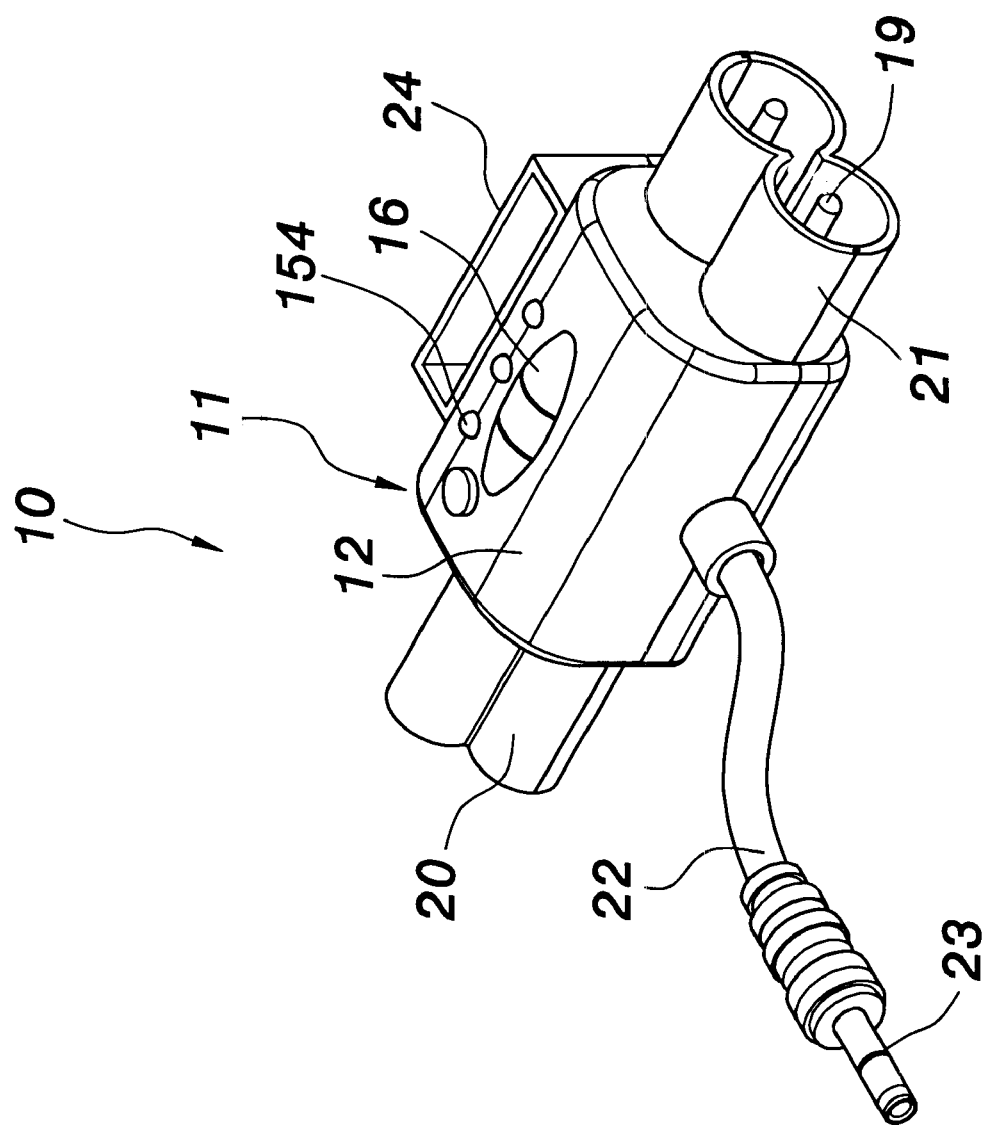
FIG. 7 is a perspective view of a third embodiment of the present invention.

As shown in FIG. 7, the count of the first insertion elements 18 and the second insertion elements 19 can vary. In this embodiment, two first insertion elements 18 and two second insertion elements 19 are disposed. In the above embodiment, three first insertion elements 18 and three second insertion elements 19 are disposed.

Figure 8:
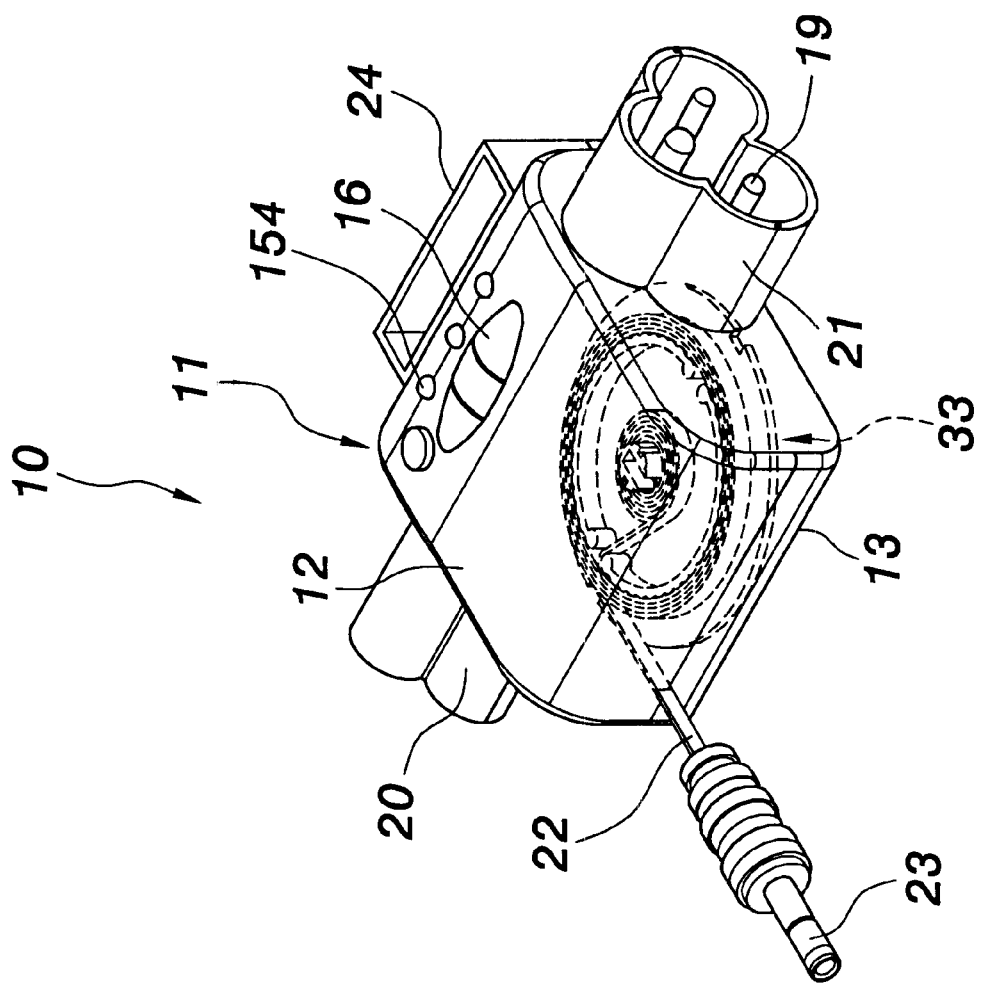
FIG. 8 is a perspective view of a fourth embodiment of the present invention.

As shown in FIG. 8, a wire-winding unit 33 can also be disposed in the main body 11 of the present invention. The cable 22 is wound in the wire-winding unit 33 so that the cable 22 can be selectively rewound into or pulled out of the main body 11. The length of the cable 22 can thus be adjusted at any time according to necessity so that entanglement of cable due to a too long length of external cable or inconvenient use due to a too short length of external cable will not arise.

Figure 9:
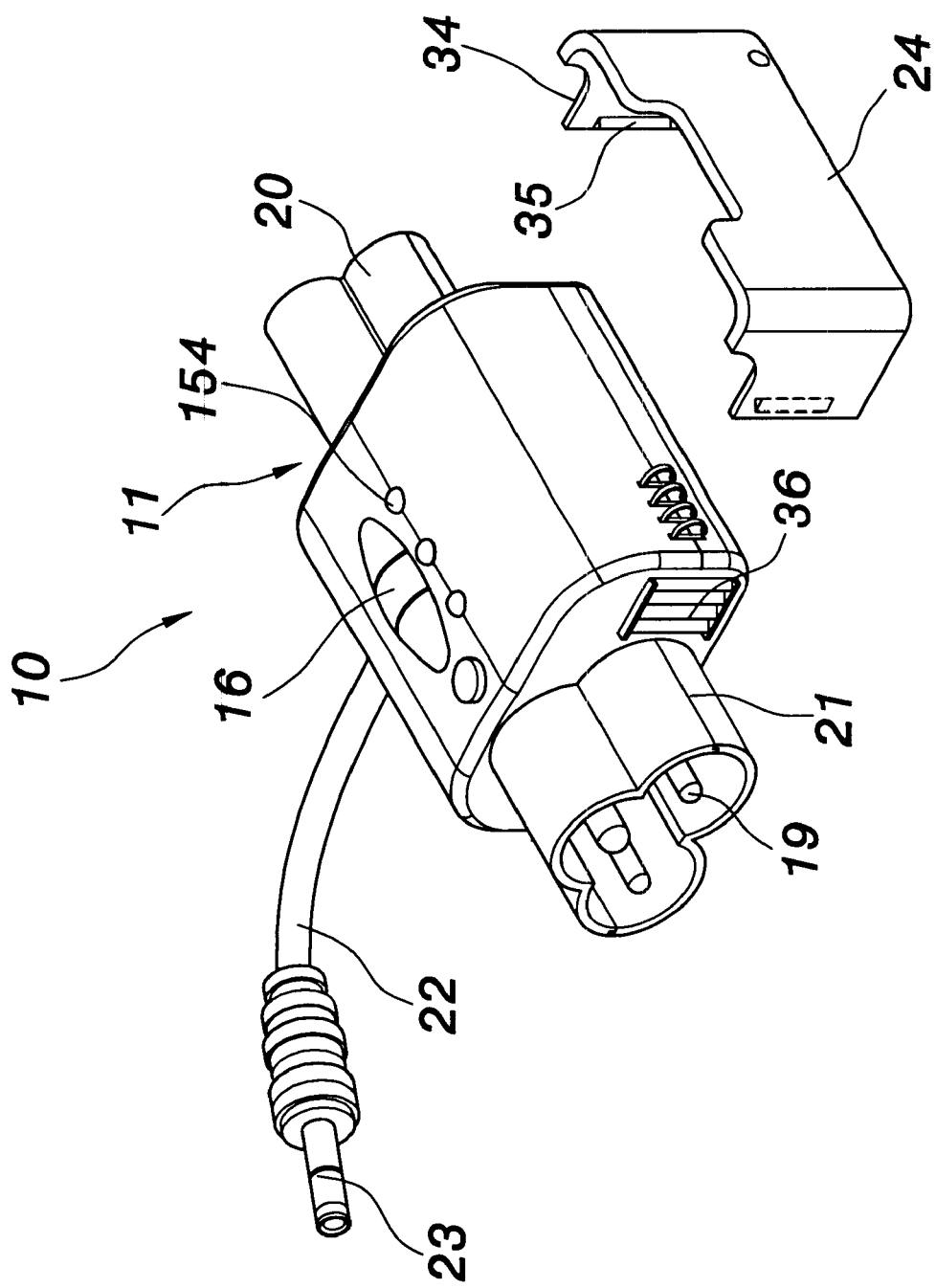
FIG. 9 is a perspective view of a fifth embodiment of the present invention.
Figure 10:
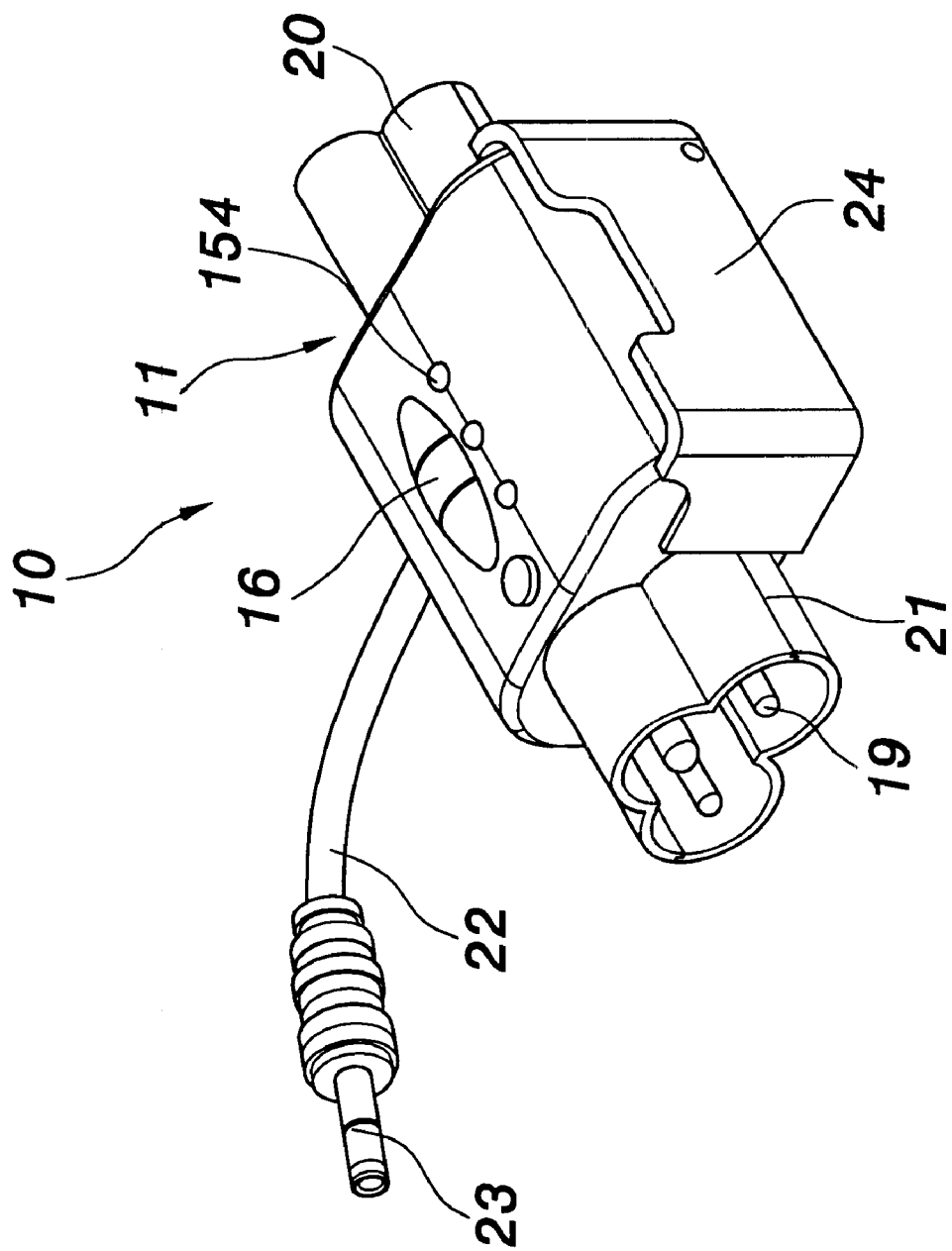
FIG. 10 is a diagram showing an adjustment state of the fifth embodiment of the present invention.

As shown in FIGS. 9 and 10, the bearing seat 24 can be separately joined on the main body 11. Two connection sheets 34 extend from left and right sides of the bearing seat 24. Positioning bodies 35 are disposed inside the two connection sheets 34. Corresponding positioning teeth 36 more than one section are disposed at left and right sides of the main body 11. The two positioning bodies 35 resiliently mesh with the positioning teeth 36 so that the bearing seat 24 can be adjustably joined on the main body 11. The bearing seat 24 can be retractably adjusted to vary the inner space of the bearing seat 24, hence applying to batteries and mobile phones of different types. If desktop-charging function is not required, the bearing seat 24 can be separated from the main body 11, or the bearing seat 24 can be pressed downwards to shrink the volume. Additionally, the bearing seat 24 can also be designed to be adjustable up and down, hence applying to batteries of different lengths and shrinking the volume to minimum to occupy less space when not used for charging.

Figure 11:
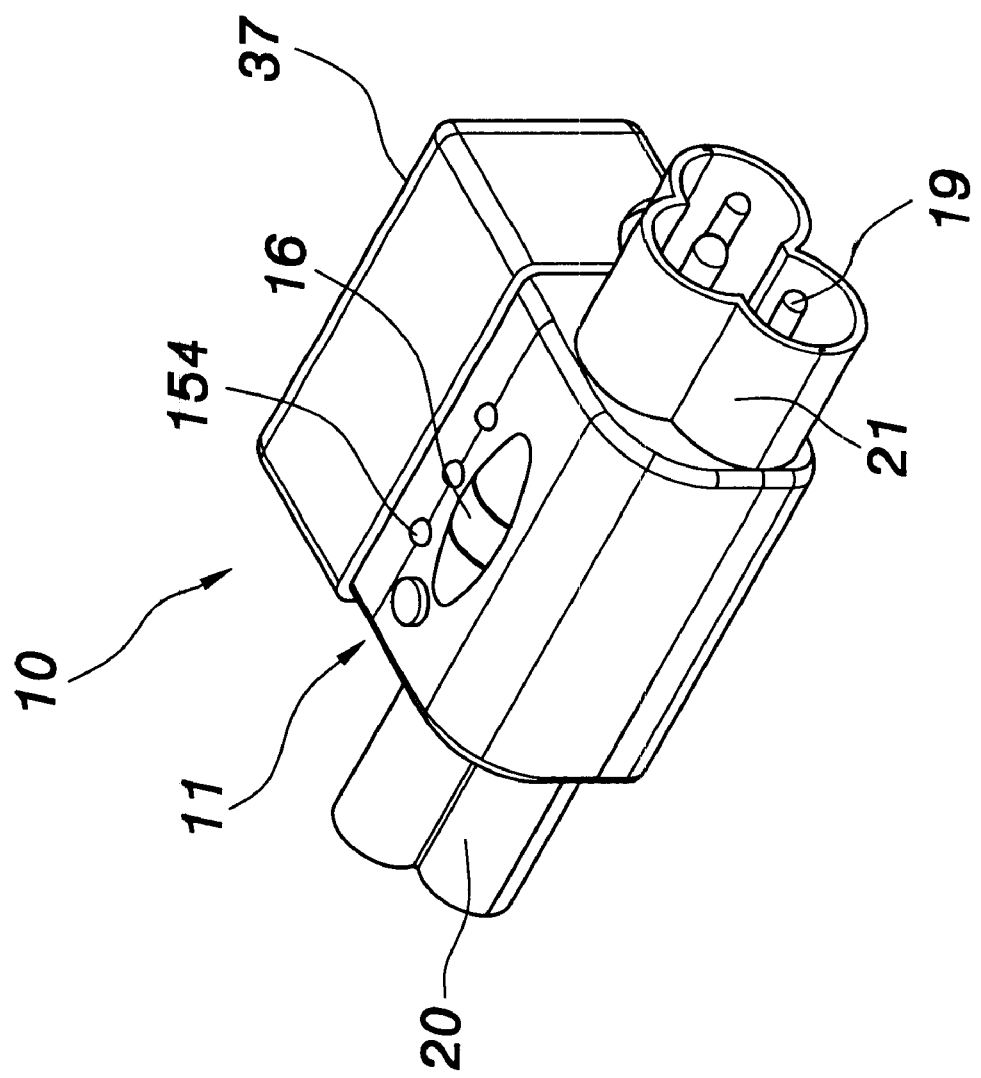
FIG. 11 is a perspective view of a sixth embodiment of the present invention.
Figure 12:
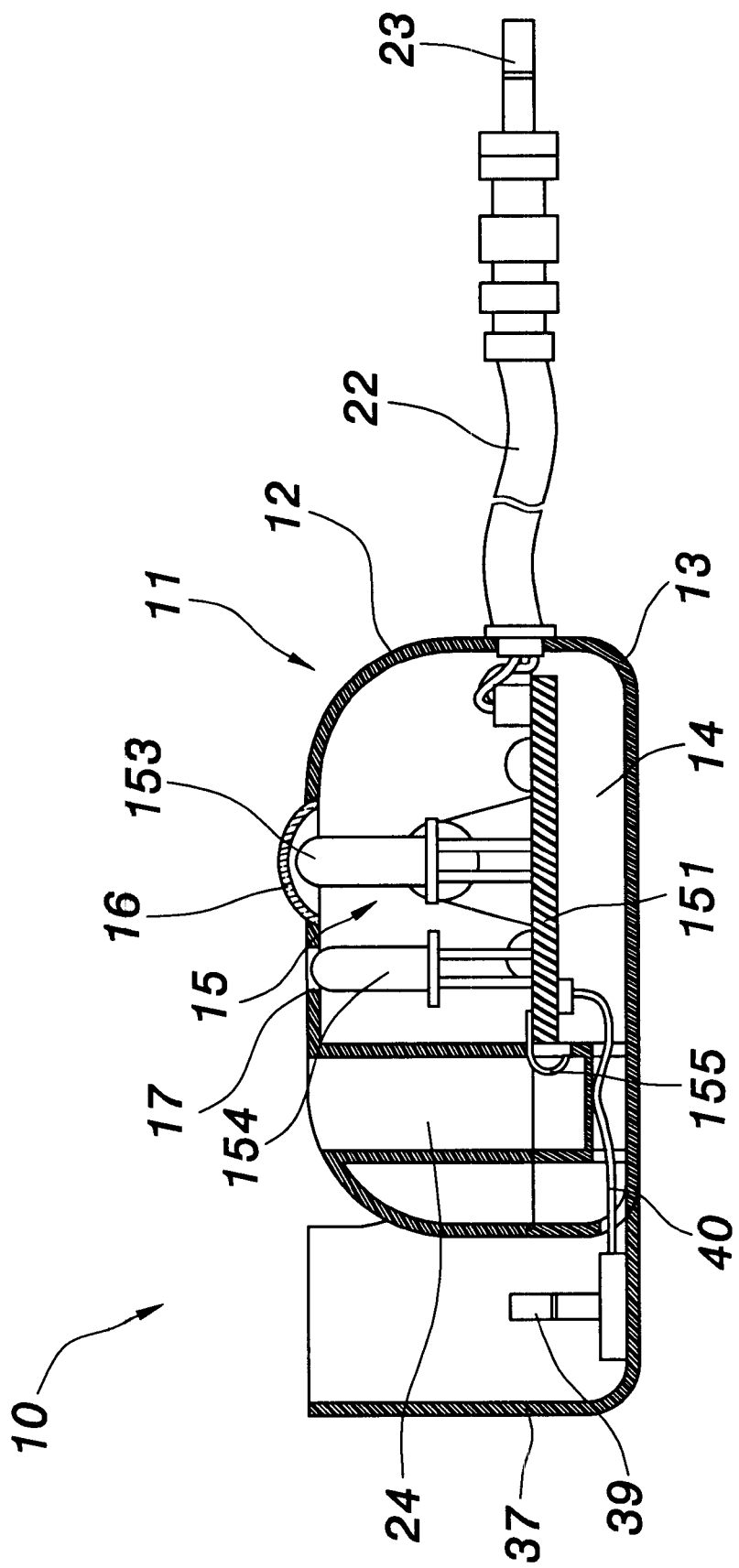
FIG. 12 is a cross-sectional view of the sixth embodiment of the present invention.
Figure 13:
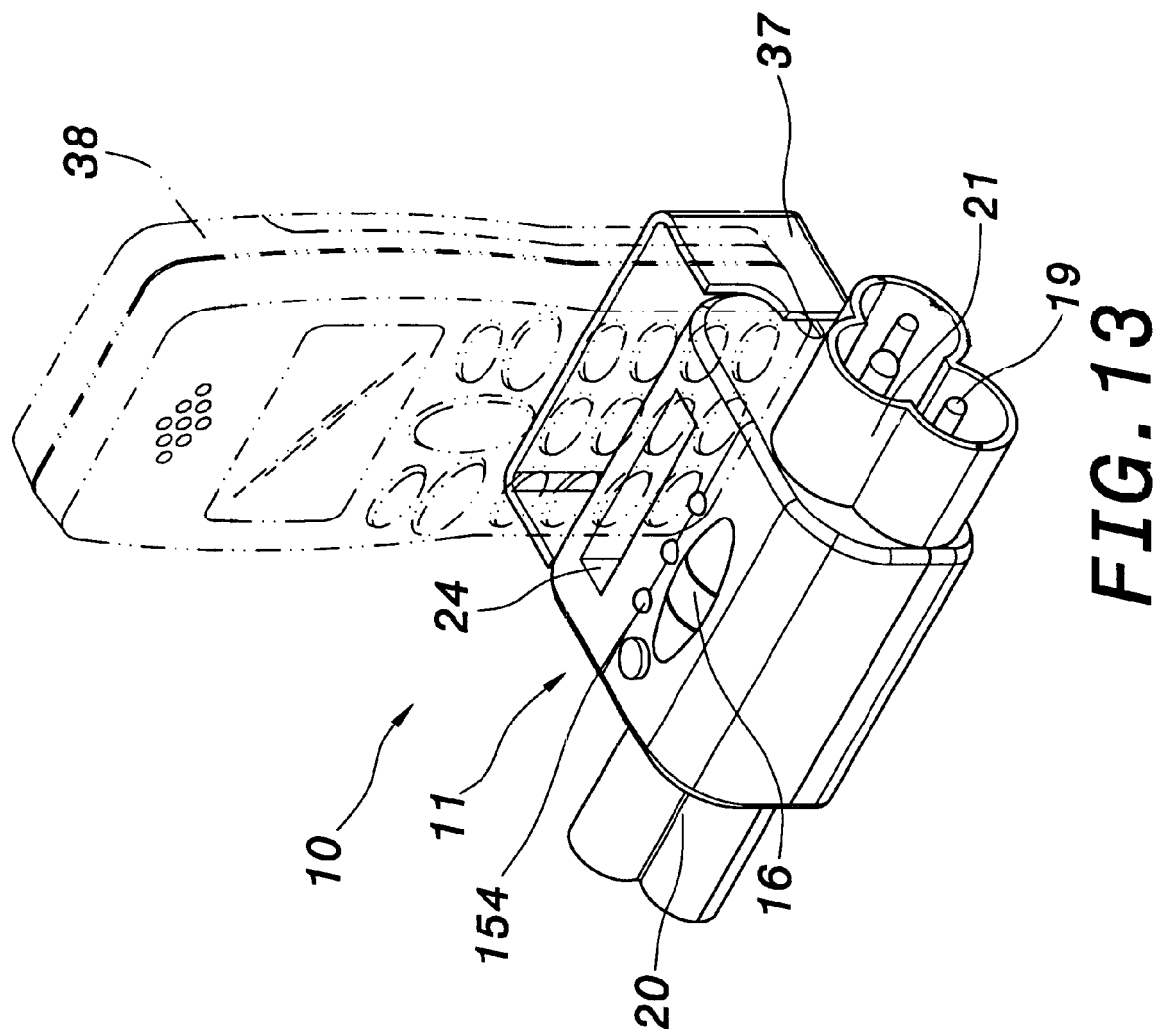
FIG. 13 is a diagram showing a use state of the sixth embodiment of the present invention.

As shown in FIGS. 11, 12, and 13, a foldable bearing seat 37 can also be joined at the outside of the main body 11. The foldable bearing seat 37 is pivotally joined on the main body 11. The foldable bearing seat 37 is a hollow shell body. The shape of the foldable bearing seat 37 is not limited, and can vary according to necessity. The top of the foldable bearing seat 37 is open so that a portable electronic device 38 can be inserted into the foldable bearing seat 37. A plurality of contact terminals 39 are disposed in the bearing seat 37. The contact terminals 39 are connected to the circuit board 151 via conducting wires 40. When the electronic device 38 is inserted into the foldable bearing seat 37, contact terminals at the bottom of the electronic device 38 can achieve electric connection with the contact terminals 39 so that the contact terminals 39 can charge the electronic device 38 inserted into the foldable bearing seat 37. Desktop-charging function is thus provided. Additionally, when the foldable bearing seat 37 is not used, it can be folded upwards and stacked on the main body 11 (as shown in FIG. 11) to save the occupied space.

Figure 14:
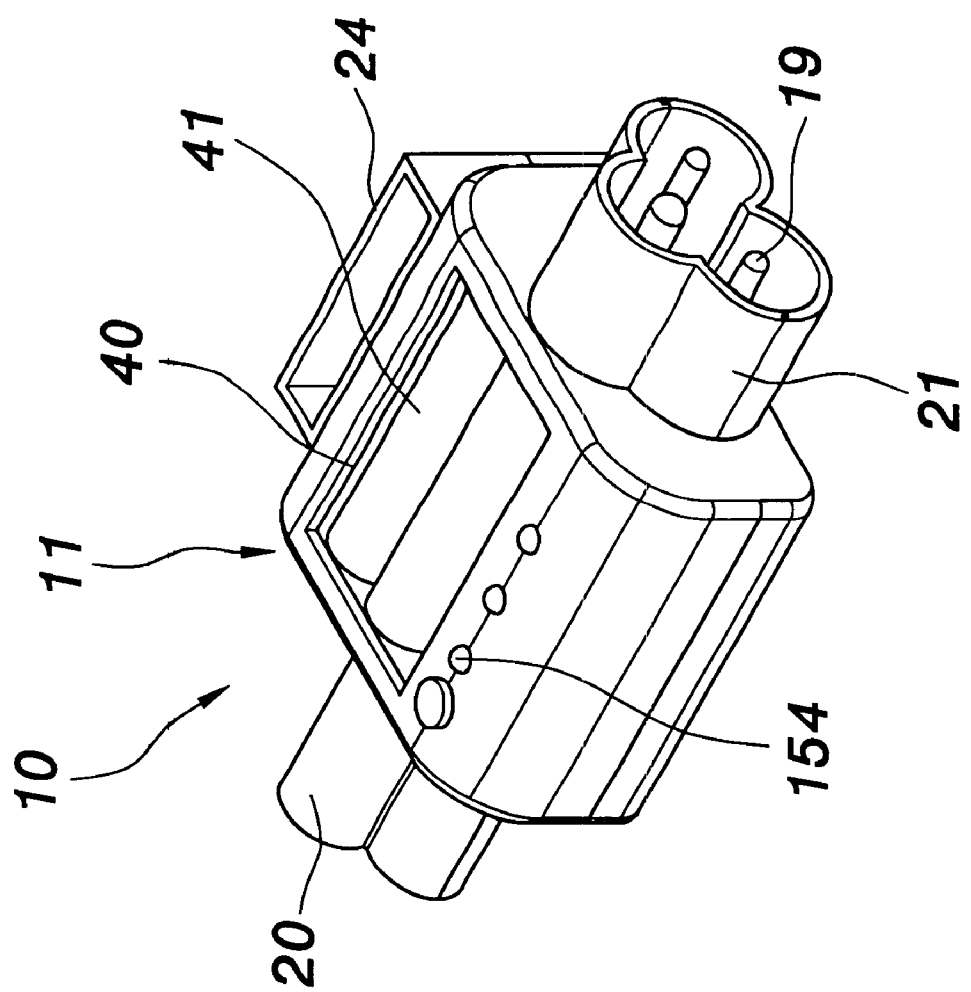
FIG. 14 is a perspective view of a seventh embodiment of the present invention.

As shown in FIG. 14, a bearing groove 40 can also be disposed on the main body 11. The top of the bearing groove 40 is open so that rechargeable batteries 41 can be inserted into the bearing groove 40. A plurality of contact elements (not shown) can be disposed in the bearing groove 40. The contact elements are connected to the circuit board 151. When the batteries 41 are inserted into the bearing groove 40, they can achieve electric connection with the contact elements in the bearing groove 40, hence charging the batteries 41.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. An adapting head having a charging mechanism, comprising:

a main body having a receiving space therein;

a circuit unit disposed in said receiving space, said circuit unit having a plurality of contact sheets;

a plurality of first insertion elements and second insertion elements directly connected to said circuit unit and extending therefrom, said first insertion elements providing for connection to a power source by a first type of connector defined by said first insertion elements extending within a first hollow shell portion of said main body and said second insertion elements are for connection to one of a power consumption device or a device to be charged by a second type of connector defined by said second insertion elements extending within a second hollow shell portion of said main body;

a bearing seat joined on said main body, one end of each of said contact sheets sticking into said bearing seat, said bearing seat defining a third type of connector for coupling to a device to be charged; and, a fourth type of connector connected to said circuit unit for coupling to a device to be charged, said fourth type of connector being different than any of said first, second and third types of connectors.

2. The adapting head having a charging mechanism as claimed in claim 1, wherein said main body is a hollow shell body composed of a first half body and a second half body by means of retaining, screwing with screws, or supersonic splicing.

3. The adapting head having a charging mechanism as claimed in claim 1, wherein a first insertion portion and a second insertion portion corresponding to said insertion elements are disposed on said main body, said two insertion portions being hollow shell bodies sheathing said insertion elements.

4. The adapting head having a charging mechanism as claimed in claim 1, wherein said circuit unit comprises a circuit board and a plurality of electronic elements, and indication lamps are disposed on said circuit board.

5. The adapting head having a charging mechanism as claimed in claim 1, wherein said bearing seat can be integrally joined on said main body, or can be separately joined on said main body.

6. The adapting head having a charging mechanism as claimed in claim 1, wherein said bearing seat is separately joined on said main body, connection sheets extending from two sides of said bearing seat, positioning bodies being disposed inside said two connection sheets, corresponding positioning teeth more than one section being disposed at two sides of said main body, said two positioning bodies resiliently meshing with said positioning teeth so that said bearing seat can be adjustably joined on said main body.

7. The adapting head having a charging mechanism as claimed in claim 1, wherein a bearing groove is disposed on said main body, contact elements being disposed in said bearing groove, said contact elements being connected to said circuit board.

8. The adapting head having a charging mechanism as claimed in claim 1, wherein said circuit unit includes a circuit board, said fourth type of connector being a plug connected to said circuit board via a cable.

9. The adapting head having a charging mechanism as claimed in claim 6, wherein a wire-winding unit can be disposed in said main body, and said cable is wound in said wire-winding unit.

10. An adapting head having a charging mechanism, comprising:

a main body having a receiving space therein;

a circuit unit disposed in said receiving space, said circuit unit having a plurality of contact sheets;

a plurality of first insertion elements and second insertion elements connected to said circuit unit;

a bearing seat joined on said main body, one end of each of said contact sheets sticking into said bearing seat; and, a foldable bearing seat pivotally joined to an outside of said main body, a plurality of contact terminals being disposed in said foldable bearing seat, said contact terminals being connected to said circuit unit via conducting wires, said foldable bearing seat being capable of being folded and stacked on said main body.

\* \* \* \* \*